United States Patent
Phanco (10) Patent No.: US 11,457,558 B1
(45) Date of Patent: Oct. 4, 2022

(54) AUTONOMOUS VEHICLE NAVIGATION (71) Applicant: Hydro-Gear Limited Partnership, Sullivan, IL (US)

(72) Inventor: Eric S. Phanco, Plainfield, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 216 days.

(21) Appl. No.: 15/930,839

(22) Filed: May 13, 2020

Related U.S. Application Data (60) Provisional application No. 62/848,351, filed on May 15, 2019.

(51) Int. Cl.
| | |
|---|---|
| *A01D 34/00* | (2006.01) |
| *G05D 1/02* | (2020.01) |
| *G06T 7/10* | (2017.01) |
| *G06K 9/62* | (2022.01) |
| *G06V 20/56* | (2022.01) |

(Continued)

(52) U.S. Cl.
CPC ......... *A01D 34/008* (2013.01); *G05D 1/0223* (2013.01); *G05D 1/0246* (2013.01); *G06K 9/6279* (2013.01); *G06T 7/10* (2017.01); *G06V 20/56* (2022.01); *A01D 34/64* (2013.01); *A01D 2101/00* (2013.01); *G05D 2201/0201* (2013.01); *G05D 2201/0208* (2013.01); *G06T 2207/30252* (2013.01)

(58) Field of Classification Search
CPC ............. A01D 34/008; A01D 2101/00; G05D 1/0223; G05D 1/0246; G05D 2201/0208
See application file for complete search history.

(56) References Cited

U.S. PATENT DOCUMENTS

| | | |
|---|---|---|
| 8,089,247 B2 | 1/2012 | Pellenc |
| 8,731,295 B2 | 5/2014 | Schepelmann et al. |
| 9,456,545 B2 | 10/2016 | Biber |

(Continued)

FOREIGN PATENT DOCUMENTS

| | | |
|---|---|---|
| CA | 2608174 | 4/2009 |
| CA | 2676737 | 12/2010 |

(Continued)

OTHER PUBLICATIONS

Franzius et al.; Embedded Robust Visual Obstacle Detection on Autonomous Lawn Mowers; 2017 IEEE Conf. on Computer Vision and Pattern Recognition Workshops; pp. 361-369 (Year: 2017).*

*Primary Examiner* — Michael J Zanelli
(74) *Attorney, Agent, or Firm* — Neal, Gerber & Eisenberg LLP (57) ABSTRACT

A lawn mower including a vision sensor configured to capture an image, a drive system configured to move the lawn mower at a velocity and configured to change the velocity, a processor connected to the vision sensor and the drive system, the processor comprising processing logic that includes a first movement threshold, the processor configured to divide the image into a plurality of image sections, categorize, for each image section, the image data, into one of mowable image data and unmowable image data, obtain, for each image section, a percentage of unmowable image data, and assign one of a first result value and a second result value to each section based on a comparison between the percentage with the first movement threshold.

20 Claims, 6 Drawing Sheets

201

| 1 | 2 | 3 |
|---|---|---|
| 4 | 5 | 6 |

201a
| 0% | 0% | 0% |
|---|---|---|
| 0% | 0% | 0% |

201b
| Yes | Yes | Yes |
|---|---|---|
| Yes | Yes | Yes |

202

| 1 | 2 | 3 |
|---|---|---|
| 4 | 5 | 6 |

202a
| 0% | 57% | 100% |
|---|---|---|
| 0% | 1% | 60% |

202b
| Yes | Maybe | No |
|---|---|---|
| Yes | Yes | Maybe |

(51) Int. Cl.
  *A01D 101/00*   (2006.01)
  *A01D 34/64*    (2006.01)

(56) References Cited

U.S. PATENT DOCUMENTS

| | | |
|---|---|---|
| 9,603,300 B2 | 3/2017 | Pettersson |
| 9,713,302 B2 | 7/2017 | Sandin et al. |
| 9,826,678 B2 | 11/2017 | Balutis et al. |
| 2016/0342864 A1 | 11/2016 | Schepelmann et al. |
| 2016/0363933 A1 | 12/2016 | Balutis et al. |
| 2017/0020064 A1 | 1/2017 | Doughty et al. |
| 2017/0038772 A1 | 2/2017 | Ratanaphanyarat et al. |
| 2017/0094897 A1 | 4/2017 | Balutis et al. |
| 2017/0364828 A1 | 12/2017 | Bennett et al. |
| 2019/0384316 A1* | 12/2019 | Qi ................... G05D 1/0246 |
| 2020/0042009 A1* | 2/2020 | Yang ................ G05D 1/0246 |

FOREIGN PATENT DOCUMENTS

| | | | |
|---|---|---|---|
| CA | 2929508 | 11/2017 | |
| CN | 106258166 A | * 1/2017 | ............. A01D 34/00 |
| EP | 2922384 | 9/2015 | |
| EP | 2946650 | 11/2015 | |
| EP | 3097755 | 11/2016 | |
| GB | 2517572 | 2/2015 | |
| WO | WO2016099616 | 6/2016 | |

\* cited by examiner

| 210a | | | 210b | | |
|---|---|---|---|---|---|
| 22% | 22% | 6% | Maybe | Maybe | Yes |
| 0% | 0% | 0% | Yes | Yes | Yes |

211

| 211a | | | 211b | | |
|---|---|---|---|---|---|
| 50% | 44% | 0% | Maybe | Maybe | Yes |
| 0% | 0% | 0% | Yes | Yes | Yes |

212

| 212a | | | 212b | | |
|---|---|---|---|---|---|
| 83% | 42% | 0% | No | Maybe | Yes |
| 0% | 0% | 0% | Yes | Yes | Yes |

213

| 213a | | | 213b | | |
|---|---|---|---|---|---|
| 100% | 18% | 0% | No | Yes | Yes |
| 17% | 2% | 0% | Yes | Yes | Yes |

214

| 214a | | | 214b | | |
|---|---|---|---|---|---|
| 90% | 0% | 0% | No | Yes | Yes |
| 39% | 0% | 0% | Maybe | Yes | Yes |

| 65% | 0% | 0% |
| --- | --- | --- |
| 38% | 0% | 0% |

215b

| Maybe | Yes | Yes |
| --- | --- | --- |
| Maybe | Yes | Yes |

216

216a

| 40% | 0% | 0% |
| --- | --- | --- |
| 13% | 0% | 0% |

216b

| Maybe | Yes | Yes |
| --- | --- | --- |
| Yes | Yes | Yes |

217

217a

| 35% | 0% | 0% |
| --- | --- | --- |
| 13% | 0% | 0% |

217b

| Maybe | Yes | Yes |
| --- | --- | --- |
| Yes | Yes | Yes |

218

218a

| 17% | 0% | 0% |
| --- | --- | --- |
| 12% | 0% | 0% |

218b

| Yes | Yes | Yes |
| --- | --- | --- |
| Yes | Yes | Yes |

219

219a

| 0% | 0% | 0% |
| --- | --- | --- |
| 0% | 0% | 0% |

219b

| Yes | Yes | Yes |
| --- | --- | --- |
| Yes | Yes | Yes |

| 99% | 71% | 99% |
|---|---|---|
| 19% | 0% | 19% |

220b

| No | Maybe | No |
|---|---|---|
| Yes | Yes | Yes |

221

221a

| 100% | 92% | 99% |
|---|---|---|
| 28% | 2% | 44% |

221b

| No | No | No |
|---|---|---|
| Maybe | Yes | Maybe |

222

222a

| 100% | 100% | 100% |
|---|---|---|
| 0% | 0% | 45% |

222b

| No | No | No |
|---|---|---|
| Yes | Yes | Maybe |

223

223a

| 42% | 78% | 99% |
|---|---|---|
| 0% | 0% | 28% |

223b

| Maybe | Maybe | No |
|---|---|---|
| Yes | Yes | Maybe |

224

224a

| 1% | 41% | 94% |
|---|---|---|
| 0% | 0% | 9% |

224b

| Yes | Maybe | No |
|---|---|---|
| Yes | Yes | Yes |

| 0% | 15% | 92% |
|---|---|---|
| 0% | 0% | 22% |

225b

| Yes | Yes | No |
|---|---|---|
| Yes | Yes | Maybe |

226

226a

| 0% | 2% | 86% |
|---|---|---|
| 0% | 0% | 35% |

226b

| Yes | Yes | No |
|---|---|---|
| Yes | Yes | Maybe |

227

227a

| 0% | 0% | 65% |
|---|---|---|
| 0% | 0% | 38% |

227b

| Yes | Yes | Maybe |
|---|---|---|
| Yes | Yes | Maybe |

228

228a

| 0% | 0% | 49% |
|---|---|---|
| 0% | 0% | 36% |

228b

| Yes | Yes | Maybe |
|---|---|---|
| Yes | Yes | Maybe |

229

229a

| 0% | 0% | 17% |
|---|---|---|
| 0% | 0% | 17% |

229b

| Yes | Yes | Yes |
|---|---|---|
| Yes | Yes | Yes |

FIG. 4B

AUTONOMOUS VEHICLE NAVIGATION

REFERENCE TO RELATED APPLICATION

This application claims the benefit of U.S. Provisional Patent Application Ser. No. 62/848,351, filed on May 15, 2019, which is incorporated by reference in its entirety.

FIELD OF THE INVENTION

This application relates to autonomous lawn vehicles, a category that includes lawn mowers, tractors, and landscaping machinery.

BACKGROUND

The lawn mower industry continues to seek ways to ease users' physical burdens. Thus, lawn mowers have undergone an automation evolution, starting with self-propulsion, with recent developments signaling a movement towards unmanned (or autonomous) technology. These developments aim to purge physical labor from lawn mowing, at least as much as possible.

The typical autonomous lawn mower includes a navigation system, which helps the autonomous lawn mower travel about, and stay within the bounds of, a user's lawn. Commonly, a boundary wire, emitting an electromagnetic field, defines the bounds of the user's lawn and identifies permanent obstacles like trees or flower beds. Sensors on the lawn mower detect the electromagnetic field so that, when the autonomous lawn mower confronts part of the lawn boundary or a permanent obstacle, the lawn mower can execute an evasive maneuver, turning away from the wire, for example.

But a boundary wire cannot address temporary obstacles and periodic changes in a lawn. Installing an underground wire to mark patches of discolored or damaged grass, seasonal lawn ornaments, work or excavation areas, or young plants would require continual, costly, and time-consuming revisions to the wire arrangement. Because of this, the typical autonomous lawn mower relies on a collision or bump sensor to negotiate temporary obstacles. Over time, however, reliance on this collision sensor can result in damage to the encountered obstacles or the lawn mower itself. What is more, of course, the collision sensor cannot sense many periodic irregularities, like dead grass patches or holes.

SUMMARY

A vision-based navigation system can address temporary obstacles and periodic changes in a lawn by analyzing, in real-time, the conditions in front of or near the lawn mower. At its most basic, an autonomous lawn mower vision system will include a camera, for example, that continually captures images as the lawn mower moves forward. The vision-based navigation system permits forward movement by receiving and processing unobstructed images of the lawn. When the lawn mower approaches an obstacle that the lawn mower cannot or should not mow, the camera will capture an image of that obstacle and a processor will determine that the image data represent an obstacle. The image processor can be a dedicated processor in communication with a main processor responsible for directing movement of the lawn mower, or the main processor may also process image data. As a result, the main processor will implement some change to the lawn mower's course.

An exemplary disclosed lawn mower comprises a vision sensor configured to capture an image. The exemplary disclosed lawn mower also comprises a processor connected to the vision sensor and comprising logic having a first movement threshold. The processor is configured to divide the image into a plurality of image sections. Each image section comprises image data. The processor also is configured categorize each of the image data in each image section into one of mowable image data and unmowable image data. The processor also is configured to calculate, for each image section, a percentage of unmowable image data and assign a result value, for each image section, based on a comparison between the percentage and the first movement threshold.

Some exemplary lawn mowers further comprise a drive system in communication with the processor. The drive system is configured to move the lawn mower at a velocity and configured to change the velocity from a first velocity to a second velocity.

In some such exemplary lawn mowers, the processor commands the drive system to maintain the first velocity in response to the assigned result values for the plurality of image sections. Further, in some such exemplary lawn mowers, the lawn mower will continue to move toward an assigned result value indicative of the percentage being less than or equal to the first movement threshold. Further, in some such exemplary lawn mowers, the lawn mower will continue to move toward an assigned result value indicative of the percentage being less than the first movement threshold.

In some such exemplary lawn mowers, the processor commands the drive system to change the velocity from the first velocity to the second velocity in response to the assigned result values for the plurality of image sections. Further, in some such exemplary lawn mowers, the change in velocity from the first velocity to the second velocity results in execution of a turn.

Moreover, in some such exemplary lawn mowers, the lawn mower will turn away from an assigned result value indicative of the percentage being greater than the first movement threshold. Moreover, in some such exemplary lawn mowers, the lawn mower will turn away from an assigned result value indicative of the percentage being greater than or equal to the first movement threshold.

Moreover, some such exemplary lawn mowers further comprise logic having a second movement threshold. Additionally, in some such exemplary lawn mowers, the processor is configured to assign three result values: a first result value, assigned to an image section if the percentage is less than or equal to the first movement threshold; a second result value assigned to an image section if the percentage is greater than the first movement threshold and less than or equal to the second movement threshold; and a third result value assigned to an image section if the percentage is greater than the second movement threshold. Additionally, in some such exemplary lawn mowers, the processor is configured to assign three result values: a first result value, assigned to an image section if the percentage is less than the first movement threshold; a second result value assigned to an image section if the percentage is greater than or equal to the first movement threshold and less than or equal to the second movement threshold; and a third result value assigned to an image section if the percentage is greater than the second movement threshold. Additionally, in some such exemplary lawn mowers, the processor is configured to assign three result values: a first result value, assigned to an image section if the percentage is less than the first movement threshold; a second result value assigned to an image section if the percentage is greater than or equal to the first movement threshold and less than the second movement threshold; and a third result value assigned to an image section if the percentage is greater than or equal to the second movement threshold. Additionally, in some such exemplary lawn mowers, the processor is configured to assign three result values: a first result value, assigned to an image section if the percentage is less than or equal to the first movement threshold; a second result value assigned to an image section if the percentage is greater than the first movement threshold and less than the second movement threshold; and a third result value assigned to an image section if the percentage is greater than or equal to the second movement threshold.

Another exemplary disclosed lawn mower comprises a vision sensor configured to capture an image. The exemplary disclosed lawn mower also comprises a drive system configured to move the lawn mower at a velocity and configured to change the velocity. The exemplary disclosed lawn mower also comprises a processor connected to the vision sensor and the drive system. The processor comprises processing logic having a first movement threshold. The processor is configured to divide the image into a plurality of image sections and categorize, for each image section, the image data, into one of mowable image data and unmowable image data. The processor also is configured to obtain, for each image section, a percentage of unmowable image data and assign one of a first result value and a second result value to each section based on a comparison between the percentage with the first movement threshold.

Another exemplary disclosed lawn mower comprises a vision sensor configured to capture an image. The exemplary disclosed lawn mower also comprises a drive system configured to move the lawn mower at a velocity and configured to change the velocity. The exemplary disclosed lawn mower also comprises a processor connected to the vision sensor and the drive system. The processor comprises processing logic having a first movement threshold. The processor is configured to divide the image into a plurality of image sections and categorize, for each image section, the image data, into one of mowable image data and unmowable image data. The processor also is configured to obtain, for each image section, a percentage of mowable image data and assign one of a first result value and a second result value to each section based on a comparison between the percentage with the first movement threshold.

Another exemplary disclosed lawn mower comprises a vision sensor configured to capture an image of an area being approached and a processor connected to the vision sensor and comprising logic having a first movement threshold. The processor is configured to divide the image into a grid of image sections. Each of the image sections comprises a separate set of image data. Each set of image data comprises corresponds to a respective portion of the area being approached. The processor also is configured to, for each of the image sections in the grid, categorize each image datum within the corresponding set of image data as mowable or unmowable, calculate a percentage of the corresponding set of image data that is categorized as unmowable, and assign a result value based on a comparison between the calculated percentage and the first movement threshold. The exemplary disclosed lawn mower also comprises a drive system in communication with the processor and configured to control movement of the lawn mower based on the result value of each of the image sections in the grid.

In some exemplary lawn mowers, the processor is configured to categorize each image datum within the sets of image data as mowable or unmowable via an image-recognition algorithm. In some exemplary lawn mowers, each of the percentages represents a proportion of the respective portion of the area being approached that is categorized as unmowable.

In some exemplary lawn mowers, the processor is configured to command the drive system to change a velocity of the movement of the lawn mower based on the result value of each of the image sections in the grid. In some such exemplary lawn mowers, the change in velocity includes execution of a turn. Further, in some such exemplary lawn mowers, the drive system is configured to turn the lawn mower away from one of the portions of the area being approached in response to the processor determining that the result value of a corresponding one of the image sections corresponds with the percentage being greater than the first movement threshold. Further, in some such exemplary lawn mowers, the processor is configured to determine the sharpness of the turn for the drive system based on the result value of each of the image sections in the grid.

In some exemplary lawn mowers, the processor is configured to command the drive system to maintain a velocity of the movement of the lawn mower based on the result value of each of the image sections in the grid. In some such exemplary lawn mowers, the drive system is configured to maintain the velocity of the lawn mower in response to the processor determining that the result values of a plurality of the image sections correspond with the respective percentage being less than or equal to the first movement threshold.

In some exemplary lawn mowers, for each of the image sections, the processor is configured to assign the result value further based on a comparison between the percentage and a second movement threshold. In some such exemplary lawn mowers, for the result value of each of the image sections, the processor is configured to assign a first result value in response to determining that the percentage is less than or equal to the first movement threshold, a second result value in response to determining that the percentage is greater than the first movement threshold and less than or equal to the second movement threshold, and a third result value in response to determining that the percentage is greater than the second movement threshold. Further, in some such exemplary lawn mowers, the first movement threshold corresponds with mowable terrain and the second movement threshold corresponds with unmowable terrain. Further, in some such exemplary lawn mowers, the first result value indicates that the respective portion of the area being approached is mowable, the second result value indicates that the respective portion of the area being approached is potentially mowable, and the third result value indicates that the respective portion of the area being approached is unmowable. Further, in some such exemplary lawn mowers, the drive system is configured to change a velocity of the movement of the lawn mower in response to the processor determining that the result value of one or more of the image sections is the third result value and maintain the velocity of the movement of the lawn mower in response to the processor determining that the result value of each of the image sections is the first result value. Further, some such exemplary lawn mowers further comprise one or more blades. In such exemplary lawn mowers, the processor is configured to shut off the one or more blades based on the result values of the grid of the image sections.

Another exemplary disclosed lawn mower comprises a vision sensor configured to capture an image of an area being approached and a processor connected to the vision sensor and comprising processing logic having a first movement threshold. The processor is configured to divide the image into a grid of image sections. Each of the image sections comprises a separate set of image data. Each set of image data corresponds to a respective portion of the area being approached. The processor also is configured to, for each of the image sections in the grid, categorize each image datum within the corresponding set of image data as mowable or unmowable, calculate a percentage of the corresponding set of image data that is categorized as mowable, and assign a result value based on a comparison between the calculated percentage with the first movement threshold. The exemplary disclosed lawn mower also comprises a drive system in communication with the processor and configured to control movement of the lawn mower based on the result value of each of the image sections in the grid.

In some exemplary lawn mowers, each of the percentages represents a proportion of the respective portion of the area being approached that is categorized as mowable. In some exemplary lawn mowers, the processor is configured to command the drive system to maintain or change a velocity of the movement of the lawn mower based on the result value of each of the image sections in the grid. In some such exemplary lawn mowers, the change in velocity includes a change in direction.

Another exemplary disclosed lawn mower comprises a vision sensor configured to capture an image of an area being approached and a processor connected to the vision sensor and comprising logic having a first movement threshold. The processor is configured to divide the image into a grid of image sections. Each of the image sections comprises a separate set of image data. Each set of image data corresponds to a respective portion of the area being approached. The processor also is configured to, for each of the image sections in the grid, categorize each image datum within the corresponding set of image data as mowable or unmowable, calculate a percentage of the corresponding set of image data that is categorized as unmowable, and compare the calculated percentage to the first movement threshold. The exemplary disclosed lawn mower also comprises a drive system in communication with the processor and configured to control a velocity of the lawn mower based on the comparison of the calculated percentage and the first movement threshold for each of the image sections in the grid.

The Detailed Description, below, and its accompanying drawings, will provide a better understanding of the invention and set forth embodiments that indicate the various ways to employ the invention.

DETAILED DESCRIPTION

This description describes one or more embodiments and should not limit the invention to those embodiments. The description explains principles of the invention to enable one of ordinary skill in the art to understand and apply the principles to practice both the described embodiments and other embodiments that may come to mind. The invention's scope should cover all embodiments that might fall within the scope of the claims, either literally or under the doctrine of equivalents.

An exemplary embodiment of the invention includes an autonomous lawn mower that includes a vision sensor that obtains an image that an onboard processor then analyzes. The processor's analysis helps control the lawn mower movement about a lawn and to negotiate different lawn conditions. Here, the term "lawn mower" covers various lawn-based vehicles.

A. Exemplary Lawn Mower

Figure 1:
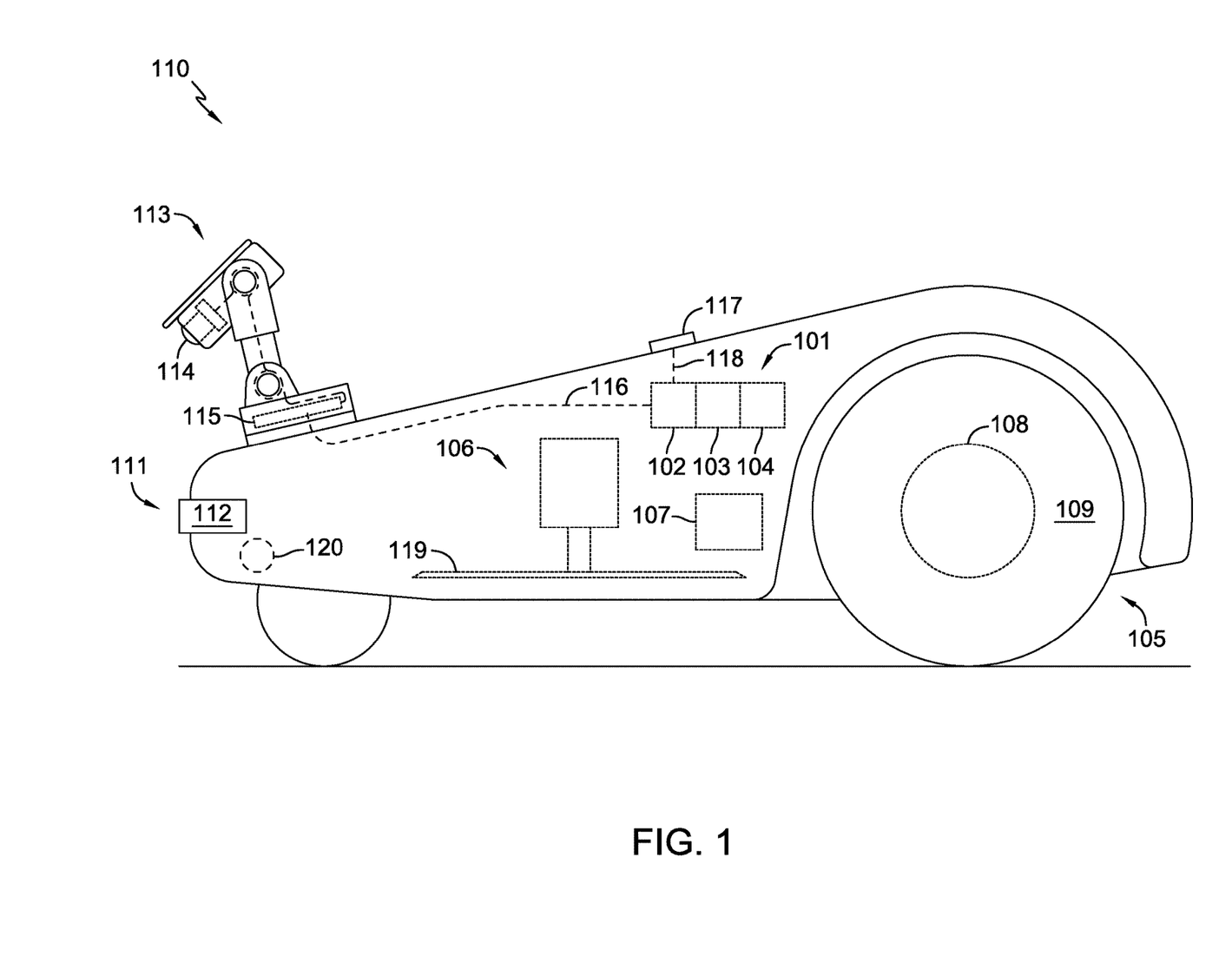
FIG. 1 is a side elevational view of an autonomous lawn mower embodiment.

Referring to FIG. 1, lawn mower 110 includes vision assembly 113, which relies on vision sensor 114 to obtain images of the area in front of or near lawn mower 110. Vision assembly 113 transmits data from these images to main board 101, which uses processor 102 to analyze the image data. Based on this analysis, from which processor 102 can glean information about the lawn mower's surroundings, components on main board 101 can control the lawn mower's movement and determine whether to stop blade rotation.

Vision assembly 113 connects with main board 101 and includes vision sensor 114, which can be a 2D or 3D camera, a 360 degree camera, radar, Lidar, or ultrasonic sensor, among other known technologies. Despite FIG. 1 showing a single vision sensor, multiple, exemplary vision sensors can serve the role of vision sensor 114, in any combination. For example, lawn mower 110 may use Lidar as a supplement or alternate to a visible light camera to continuously determine a distance between lawn mower 110 and an obstacle. This can prove beneficial in detecting obstacles and identifying corresponding movement paths in low-light environments. In other embodiments, radar or an ultrasonic sensor may supplement or replace a visible light camera.

To assess the conditions in front of or near lawn mower 110, different vision sensors employ different processing approaches. For example, a 2D or 3D camera might rely on color-based, texture-based, or structural-based processing methods, like image segmentation. These approaches isolate parts of the image to extract relevant features such as points, lines, and simple shapes to identify obstacles. Processing hardware associated with vision assembly 113 can rely on any one of several, artificial neural network-based (a convolutional neural network, for example) processing approaches to segment the image data. The neural network must be trained, however, to associate the image's features with the identifiable categories of grass, obstacles, or other lawn objects. As explained, to operate in low-light, Lidar may be used in vision assembly 113 to continually calculate the distance between lawn mower 110 and obstacles by laser distance-sensing and detecting the movement path of lawn mower 110 relative to those obstacles. Thus, the programming loaded onto the processing hardware associated with vision assembly 113 will vary with vision sensor type.

In operation, as lawn mower 110 moves about a lawn, main board 101 receives image data from vision sensor 114, where main processor 102 applies vision-based logic to identify data that represent objects, surfaces, or areas that are either mowable or unmowable. "Mowable" image data represent objects and surfaces that a typical autonomous lawn mower would or could reasonably mow, including grass, weeds, leaves, and twigs, among other objects. "Unmowable" image data represent objects and surfaces a lawn mower would not reasonably mow, like rocks, lawn ornaments, sidewalks and driveways, or children's toys, for example.

Main board 101 includes main processor 102, which processes image data from vision assembly 113 and works with onboard controllers to control drive system 105 and blade system 106. Main processor 102 comprises any chip capable of storing and executing instructions, and might combine any number of an ARM chip, a DSP, or GPU, among other processors. Main board 101 includes drive controller 103 for controlling drive system 105, and blade controller 104 for controlling blade system 106. Drive system 105 controls drive motors 108 to rotate wheels 109 to accelerate, brake, reverse, and turn lawn mower 110. Blade system 106 rotates, brakes, and shuts off blades 119.

FIG. 1 shows vision assembly 113 connected to main board 101, via connection 116, which enables main processor 102 to process image data vision sensor 114 collects. Vision assembly 113, however, can also use its own, separate vision processor 115. Vision processor 115 can hold vision-based logic, while main processor 102 remains the lawn mower's primary processor for other functions, like controlling drive controller 103 and blade controller 104.

In one exemplary embodiment, battery 107 powers autonomous lawn mower 110, which includes the functions embodied in vision assembly 113, drive system 105, and blade system 106. Battery 107 is a rechargeable, lithium-ion battery. Autonomous lawn mower 110 can feature any one of several alternative, power sources, however, such as nickel cadmium batteries, nickel metal hydride batteries, lead acid batteries, and fuel cells.

B. Exemplary Lawn Mower Operation

Figure 2:
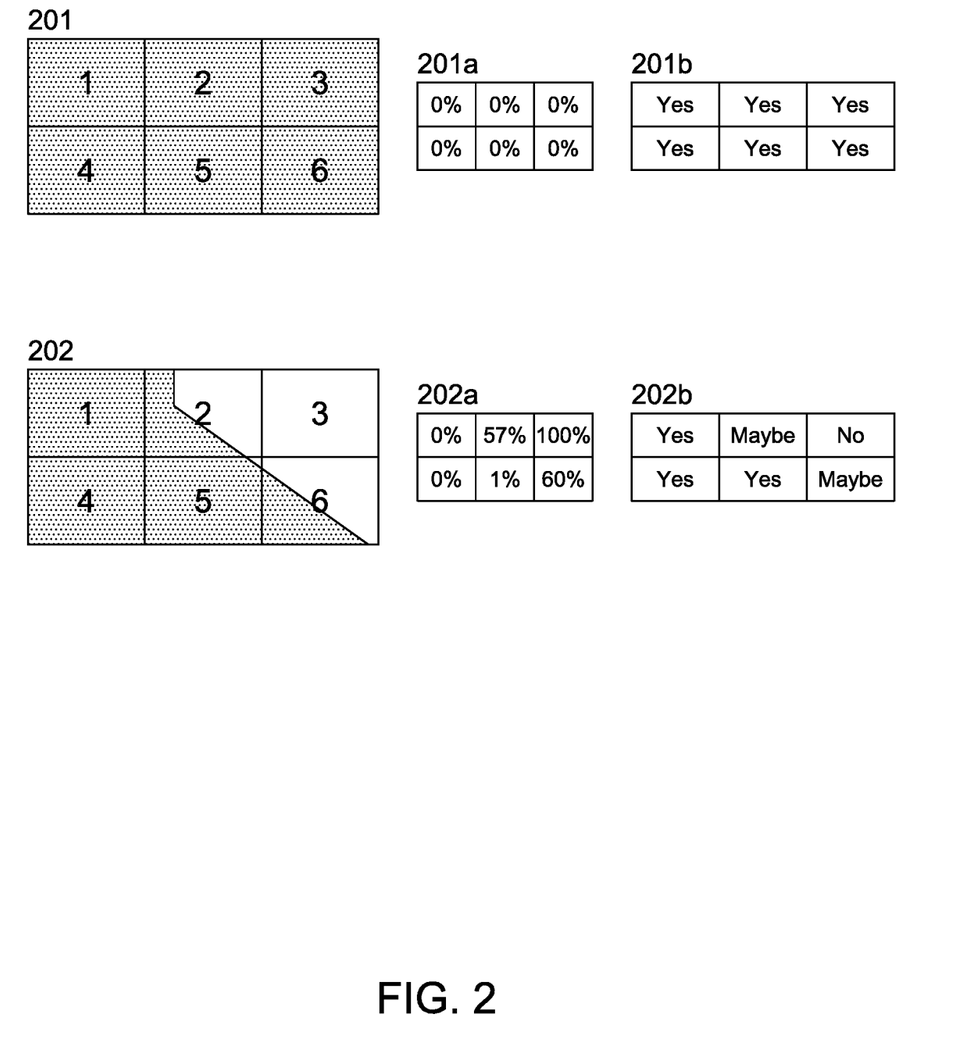
FIG. 2 shows views and tables associated with the analysis conducted by the autonomous lawn mower embodiment in FIG. 1.

In an exemplary operation, lawn mower 110 uses vision sensor 114 to capture rapid, sequential images as lawn mower 110 moves about a lawn. These images contain image data that main processor 102 processes to determine whether the terrain that lies ahead of, or nearby, lawn mower 110 is mowable or unmowable. Based on this determination, main processor 102 controls drive controller 103 or blade controller 104 (or both) to issue commands that either maintain or change the operating conditions of drive system 105 and blade system 106. FIG. 2 shows two example images that vision sensor 114 might capture while lawn mower 110 moves about a lawn.

FIGS. 3A-3B and 4A-4B show sequences that exemplify the image intake process, according to an exemplary embodiment, as lawn mower 110 moves in reaction to distinguishing mowable image data from unmowable image data. All sequences of images in this application are exemplary and represent only a possible sampling of the numerous images that vision sensor 114 might capture. Although FIGS. 3A-3B and 4A-4B include ten images each, a presentation of eight or twelve images, for example, would similarly show the movement sequence of lawn mower 110.

1. Exemplary Image Analysis

Each of FIGS. 2-4B features images positioned on the left side of each figure. Each image represents a photograph that vision sensor 114 captures as lawn mower 110 moves about a lawn. These exemplary images reveal merely a limited number of possible images vision sensor 114 might capture. Indeed, vision sensor 114 can capture image data at a framerate of anywhere between 10-120 fps, for example, permitting analyses of image data from each image to help determine whether, and to what extent, the different functions (like movement and blade rotation) of lawn mower 110 might change.

The perspective of each image that vision sensor 114 captures depends on several factors. Some of the factors that a user or programmer might consider are the height of vision sensor 114 above the lawn, the angle of vision sensor 114 relative to the horizontal baseline of the lawn, the resolution of vision sensor 114, the framerate of vision sensor 114, and the light levels surrounding lawn mower 110. For example, when vision sensor 114 is positioned at an approximate height between 10.5 to 12 inches and an angle of 20° relative to the horizontal, the field of view corresponds to an approximately 16 inches wide by 12 inches deep area (spanning in front of the lawn mower).

Each image in FIGS. 2-4B has been divided into a grid of six sections, although this application contemplates that other embodiments might feature any number of sections (four, eight, nine, or ten, for example), or alternatively, a number of sections dividing a smaller portion of the complete image to reduce data intake and improve processing time. The images can be divided into a grid of sections arranged in any number of horizontal rows and vertical columns. Available computing power, desired precision, and the speed of lawn mower 110 all factor into the determination of the proper number of sections (and the numbers of rows and columns) into which each image is divided.

Each image in FIGS. 2-4B includes two corresponding tables positioned to the right. Like each image, each table has been divided into six sections (this application will refer to each section in each table as a "cell"). The first table to the right of each image (table 201a of FIG. 2, for example) shows, in each cell, a numeric representation of each corresponding section of image 210, where the percentages (approximated for this disclosure) represent the proportion of the section that processor 102 has classified as unmowable. In other words, the higher the percentage, the greater proportion of the section the unmowable object or surface occupies. Although the exemplary FIGS. 2-4B feature percentages of the unmowable proportion of each section, lawn mower 110 could also operate by assessing the mowable proportion of each section.

Processor 102 is configured to apply an image-recognition algorithm to a section of image 210 to generate a respective percentage and/or other numeric representation that indicates the proportion of that section that is unmowable. Image-recognition algorithms are configured to detect object (s) within an image and/or characteristics of image(s). Some image-recognition algorithms include artificial neural networks and/or other machine learning algorithms, which are a form of artificial intelligence (AI) that enable a system to automatically learn and improve from experience without being explicitly programmed by a programmer for a particular function. An exemplary type of artificial neural network used for image recognition is a convolutional neural network, which may include convolutional layer(s), pooling layer(s), and fully-connected layer(s) to categorize and/or identify object(s) and/or characteristic(s) within a segment of an image. For example, processor 102 utilizes a convolutional neural network and/or another image-recognition algorithm to (1) segment a section of image 210 into regions using semantic segmentation, (2) detect which, if any, of the regions are associated with unmowable objects, and (3) determine what percentage of the section of image 210 correspond with regions associated with unmowable objects.

But referring back to exemplary FIGS. 2-4B, the second table to the right (table 201b of FIG. 2, for example) shows a Yes, Maybe, or No based on the percentage listed in each corresponding cell of the first table to the right: Yes, if the corresponding percentage is less than 20%; Maybe, if the corresponding percentage is between 20% (inclusive) and 80% (inclusive); and No, if the corresponding percentage is above 80%.

The 20% and 80% values are the two exemplary "Lawn Mower Movement Thresholds." A user or programmer may adjust these values based on empirical factors like lawn conditions, safety concerns, and preferred mowing precision. The Yes, Maybe, and No values are the exemplary "Result Values." The different arrangements of Result Values in the tables in FIGS. 2-4B, based on the image data captured by vision sensor 114 and the setting of the Lawn Mower Movement Thresholds, help determine how processor 102 interacts with drive controller 103 and blade controller 104 to either help change or maintain characteristics of the operation of lawn mower 110. This application uses the terms Lawn Mower Movement Thresholds and Result Values merely to simplify the explanation of the exemplary embodiments described here, and alternative terms could instead suffice.

Processor 102 (or a dedicated vision processor 115, as mentioned previously) may feature logic that analyzes the image data using more, or fewer, than two Lawn Mower Movement Thresholds, which would either increase or decrease the number of Result Values. For example, a Result Value table could show a Yes, Maybe, Caution, or No: Yes, if the corresponding percentage is less than 20%; Maybe, if the corresponding percentage is between 20% (inclusive) and 50% (inclusive); Caution if the corresponding percentage is between 50% and 80% (inclusive); and No, if the corresponding percentage is above 80%.

In one exemplary process, vision sensor 114 captures each image so that processor 102 can then divide the image into a grid of six sections, and analyze the corresponding image data from each section. Processor 102 determines what proportion of each section is unmowable. Processor 102 then attributes a percentage to each section that represents the proportion of the unmowable image data. Finally, processor 102 compares the percentage attributed to each section with each Lawn Mower Movement Threshold to determine the proper Result Value for the cell that corresponds to each section. Depending on the combination of Result Values, processor 102 can communicate with (1) drive controller 103, so that drive system 105 can either maintain or change the velocity (i.e., the speed and/or direction) of travel for lawn mower 110; and (2) blade controller 104, so that blade system 106 can either maintain or change the speed of rotation of blade 119, including stopping the rotation of blade 119. A user or programmer can determine whether, and to what extent, different arrangements of Result Values affect the travel or blade rotation (or both) of lawn mower 110.

For example, FIG. 2 shows image 201, captured by vision sensor 114, where all the image data represent mowable terrain, as shown by the total lack of white space. As a result, processor 102 will determine that unmowable image data occupies 0% of each section in image 201, which table 201*a* reflects. Based on Lawn Mower Movement Thresholds of 20% and 80%, like the example values described above, table 201*b* shows a Yes in each cell, which results in maintained straight, forward movement of lawn mower 110, given the lack of unmowable material in view. That is, with nothing but grass lying ahead of lawn mower 110, lawn mower 110 would not need to perform an evasive maneuver.

As another example, FIG. 2 also shows image 202, captured by vision sensor 114, where some image data now represent unmowable terrain, as shown by the white space. Table 202*a* shows that, for image 202, unmowable material occupies 57% of the top-center section, 100% of the top-right section, 1% of the bottom center section, and 60% of the bottom-right section. Based on Lawn Mower Movement Thresholds of 20% and 80%, like the example values described above, table 202*b* lists a Maybe in the top-center and bottom-right cells, while listing a No in the top-right cell. This Result Value arrangement in table 202*b* indicates an approach by lawn mower 110 toward an object in front and to the right. Thus, processor 102 will communicate with drive controller 103, which will issue a command to drive system 105 to turn lawn mower 110 to the left to begin or continue a path that avoids colliding with the object. The Maybes in the top-center and bottom-right cells of table 202*b* help processor 102 determine the sharpness at which drive controller 103 will command drive system 105 to turn lawn mower 110.

2. Exemplary Object Approach

Figure 3A:
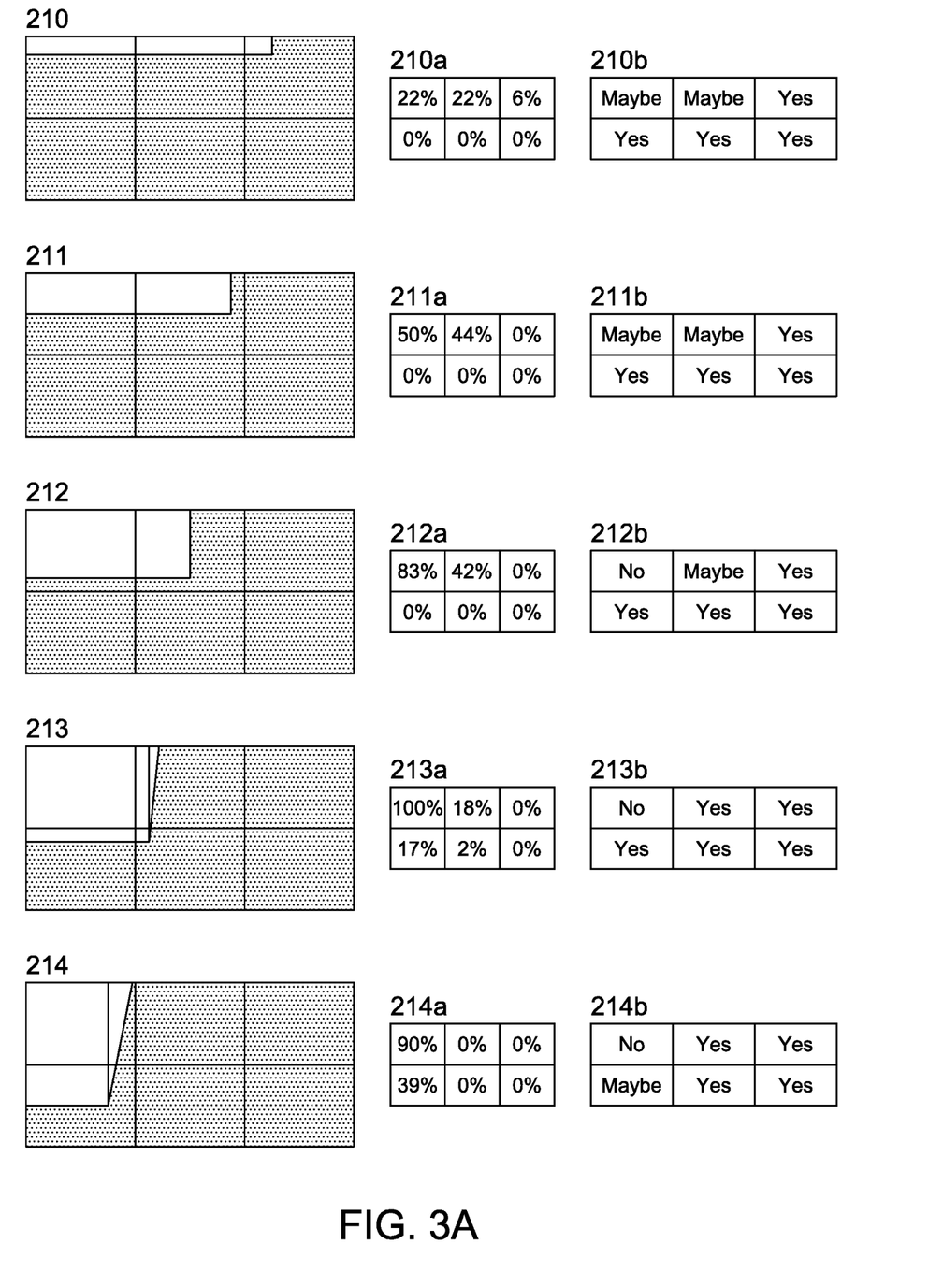
FIGS. 3A and 3B show views and tables associated with the analysis conducted by the autonomous lawn mower embodiment in FIG. 1.
Figure 3B:
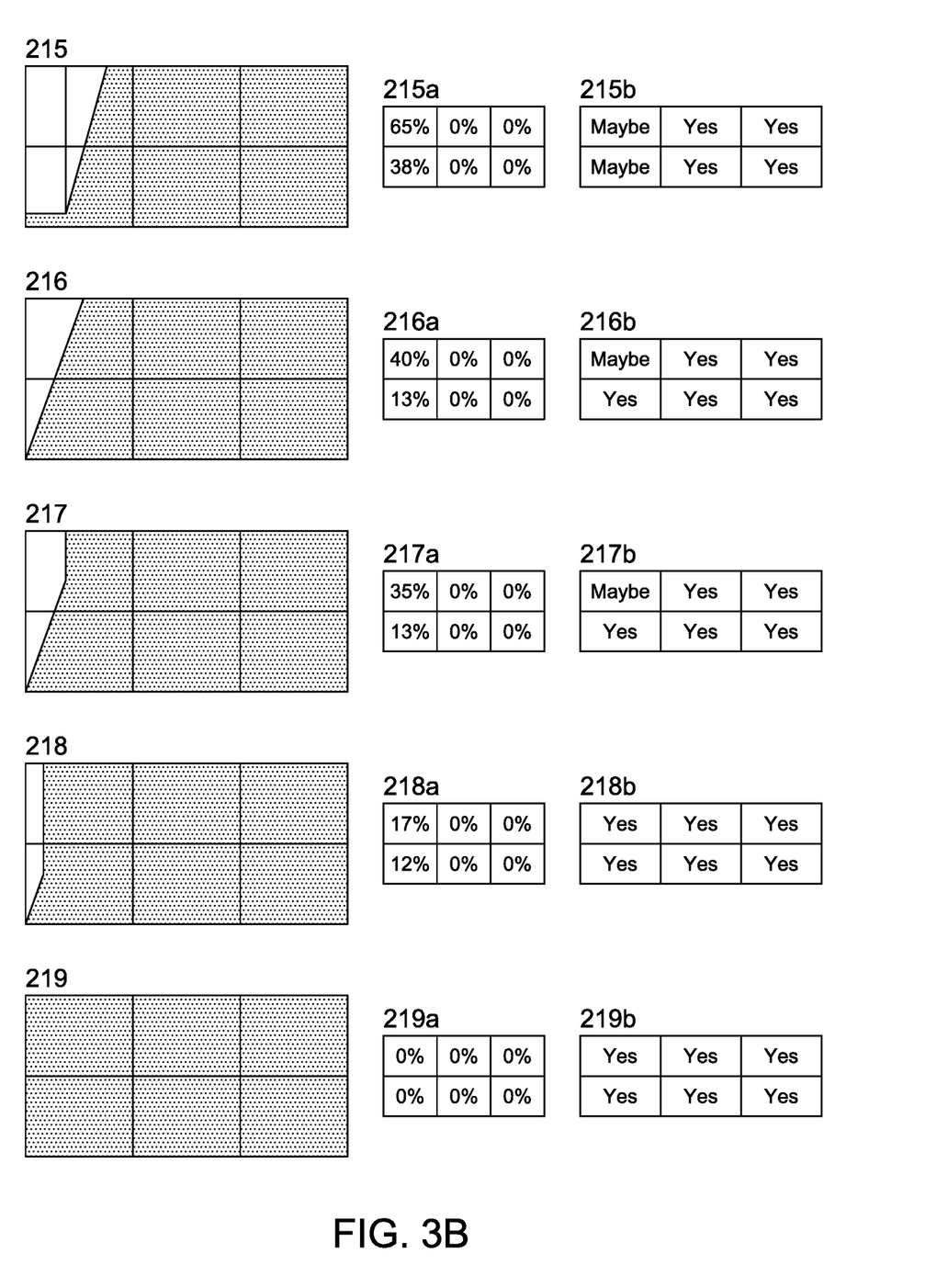

FIGS. 3A-3B show the process by which lawn mower 110 approaches an object in front, and slightly to the left, of lawn mower 110. FIG. 3A shows images 210-214, while FIG. 3B shows images 215-219. These ten images show the process through which lawn mower 110 first approaches, and then moves to the right of, the object, using Lawn Mower Movement Thresholds of 20% and 80%, which are the same thresholds used in the examples in FIG. 2. Although the descriptions for the following exemplary maneuvers in FIGS. 3A-3B do not specify changes to blade rotation for lawn mower 110, each exemplary maneuver is compatible with, and could also feature, changes to blade rotation based on the Result Value arrangements, including blade stoppage in the event, for example, all six sections exhibited a Result Value of No.

Referring to FIG. 3A, image 210 is divided into a grid of six sections and shows the object in front, and slightly to the left of the direction of travel, of lawn mower 110. Table 210*a* shows that, for image 210, the object occupies 22% of the top-left section, 22% of the top-center section, and 6% of the top-right section. These percentages reflect the presence of an object just coming into view of vision sensor 114. Table 210*b* lists a Maybe in the top-left and top-center cells, while listing a Yes in the rest of the cells. The two Maybes in table 210*b* indicate a moderate likelihood that some sort of object or unmowable surface lies ahead of lawn mower 110.

On the one hand (and for purposes of the exemplary embodiments in FIGS. 3A-3B and 4A-4B), the two Maybe Result Values cause drive controller 103 to command drive system 105 to begin a slight rightward turn for lawn mower 110. The difference between images 210 and 211 in FIG. 3A reflects this slight turn. The exemplary embodiments in FIGS. 3A-3B and 4A-4B will factor in the number and placement of the Maybe Result Values in each table in determining to what extent lawn mower 110 will turn. On the other hand, in alternative embodiments, drive controller 103 can command drive system 105 to continue moving straight while processor 102 monitors the status of each Result Value. The two Maybe Result Values would not require changing the direction of lawn mower 110.

A programmer or user could, of course, determine whether and to what extent the Maybe Result Values affect the turning of lawn mower 110, or its rate of approach toward an obstacle. Further, lawn mower 110 can implement maneuvers besides a slight or moderate turn, such as (1) stopping, turning 180°, and moving away from the obstacle; (2) stopping, reversing, and then turning to the left or right; or (3) making a U-turn or a V-shaped turn away from the obstacle. Lawn mower 110 can implement any one of, or any combination of, maneuvers when it confronts an obstacle, based on a programmer's or user's preference.

Image 211 shows the object having shifted leftward and downward, based on the forward-rightward movement of lawn mower 110, relative to the object's position in image 210. A larger portion of the object appears in image 211 compared with image 210 based on the approach of lawn mower 110. As a result, table 211a shows that the object, in image 211, occupies larger proportions of the top-left (50%) and the top-center (44%) sections than image 210. Table 211b lists a Maybe in the top-left and top-center cells, while listing a Yes in the rest of the cells. Based on this arrangement of Result Values in table 211b (the same arrangement as in 210b), which indicates a moderate likelihood that some sort of object or unmowable surface lies ahead of lawn mower 110, drive controller 103 will command drive system 105 to continue implementing the slight rightward turn lawn mower 110 began upon capturing image 210.

Image 212 shows the object having shifted farther leftward and downward, based on the forward-rightward movement lawn mower 110, relative to the object's position in image 211. Table 212a shows the object, in image 212, occupying larger proportions of the top-left (83%) and the top-center (42%) sections than image 211. Table 212b lists a No in the top-left cell and a Maybe in the top-center cell. The arrangement in table 212b differs from the arrangements in tables 210b and 211b, with a No appearing in the top-left cell. Table 212b shows a greater likelihood than tables 210b and 211b that an object or unmowable surface lies ahead of lawn mower 110. Because a No resides in the top-left cell of table 212b, drive controller 103 will command drive system 105 sharpen the right turn away from the object. The Maybe in the top-center cell of table 212b will help processor 102 determine the sharpness at which drive controller 103 will command drive system 105 to turn lawn mower 110.

Image 213 shows the object having shifted farther leftward and downward, based on the forward-rightward movement lawn mower 110, relative to the object's position in image 212. Table 213a shows the object, in image 213, occupying a larger proportion of the top-left (100%) section, but now a smaller proportion of the top-center (18%) section than image 212. Further, the object occupies 17% of the bottom-left section and 2% of the bottom-center section. Table 213b lists a No in the top-left section, which indicates that some sort of object or unmowable surface probably lies ahead of lawn mower 110. Because a No resides in the top-left cell of table 213b, lawn mower 110 will continue to change direction, as drive controller 103 will command drive system 105 to continue its right turn away from the object. Here, a Yes has replaced the Maybe in the top-center cell (which table 212b featured), as shown in table 213b, and this will determine the sharpness at which drive controller 103 will command drive system 105 to turn lawn mower 110, in contrast to the maneuver for image 212.

Image 214 shows the object having shifted farther leftward and downward, based on the forward-rightward movement lawn mower 110, relative to the object's position in image 213. Table 214a shows the object, in image 214, occupying 90% of the top-left section and 39% of the bottom-left section. Table 214b lists a No in the top-left section and a Maybe in the bottom-left section. Again, because a No resides in the top-left cell of table 214b, lawn mower 110 will continue to change direction, as drive controller 103 will command drive system 105 to continue the right turn away from the object. The Maybe in the bottom-left cell of table 214b will help processor 102 determine the sharpness at which drive controller 103 will command drive system 105 to turn lawn mower 110.

Referring to FIG. 3B, image 215 shows the object having shifted farther leftward and downward, based on the forward-rightward movement lawn mower 110, relative to the object's position in image 214. Table 215a shows the object, in image 215, occupying 65% of the top-left section and 38% of the bottom-left section. Table 215b lists a Maybe in the top-left and bottom-left sections. The Maybes in the top-left and bottom-left cells indicate that lawn mower 110 has a low likelihood of colliding with the object, or at least a lower likelihood as compared to the position of lawn mower 110 in image 214. In contrast to table 214b, for the scenario in table 215b, processor 102 will control drive controller 103 to command drive system 105 to begin to reduce the degree at which lawn mower 110 turns rightward as the object fades farther into the margins of the view of vision sensor 114. Lawn mower 110 begins to straighten out its movement path.

Image 216 shows the object having shifted farther leftward and downward, based on the forward-rightward movement lawn mower 110, relative to the object's position in image 215. Table 216a shows the object, in image 216, occupying 40% of the top-left section and 13% of the bottom-left section. Table 216b lists a Maybe in the top-left section. The Maybe in the top-left cell indicates that lawn mower 110 has a low likelihood of colliding with the object. Table 216b will cause drive system 105 to continue to reduce the degree at which lawn mower 110 turns rightward as the object fades farther into the margins of the perspective of vision sensor 114. That is, lawn mower 110 continues to further straighten out its movement path.

Image 217 shows the object having shifted farther leftward and downward, based on the forward-rightward movement lawn mower 110, relative to the object's position in image 216. Table 217a shows the object, in image 217, occupying 35% of the top-left section and 13% of the bottom-left section. Table 217b lists a Maybe in the top-left section. The Maybe in the top-left cell indicates that lawn mower 110 has a low likelihood of colliding with the object. Like for table 216b, table 217b will result in drive system 105 continuing the reduced degree at which lawn mower 110 turns rightward.

Image 218 shows the object having shifted farther leftward and downward, based on the forward-rightward movement lawn mower 110, relative to the object's position in image 217. Table 218a shows the object, in image 218, occupying 17% of the top-left section and 12% of the bottom-left section. Table 218b lists a Yes in every section, which results in straight forward movement of lawn mower 110, given the lack of a sufficiently high proportion of unmowable material in view.

Image 219 shows the object totally out of sight, based on the prior forward-rightward movement lawn mower 110. Table 219a reflects this, showing 0% in every cell, while table 219b lists a Yes in every box, which results in straight forward movement of lawn mower 110, given the lack of unmowable material in view.

3. Exemplary Corner Approach

Figure 4A:
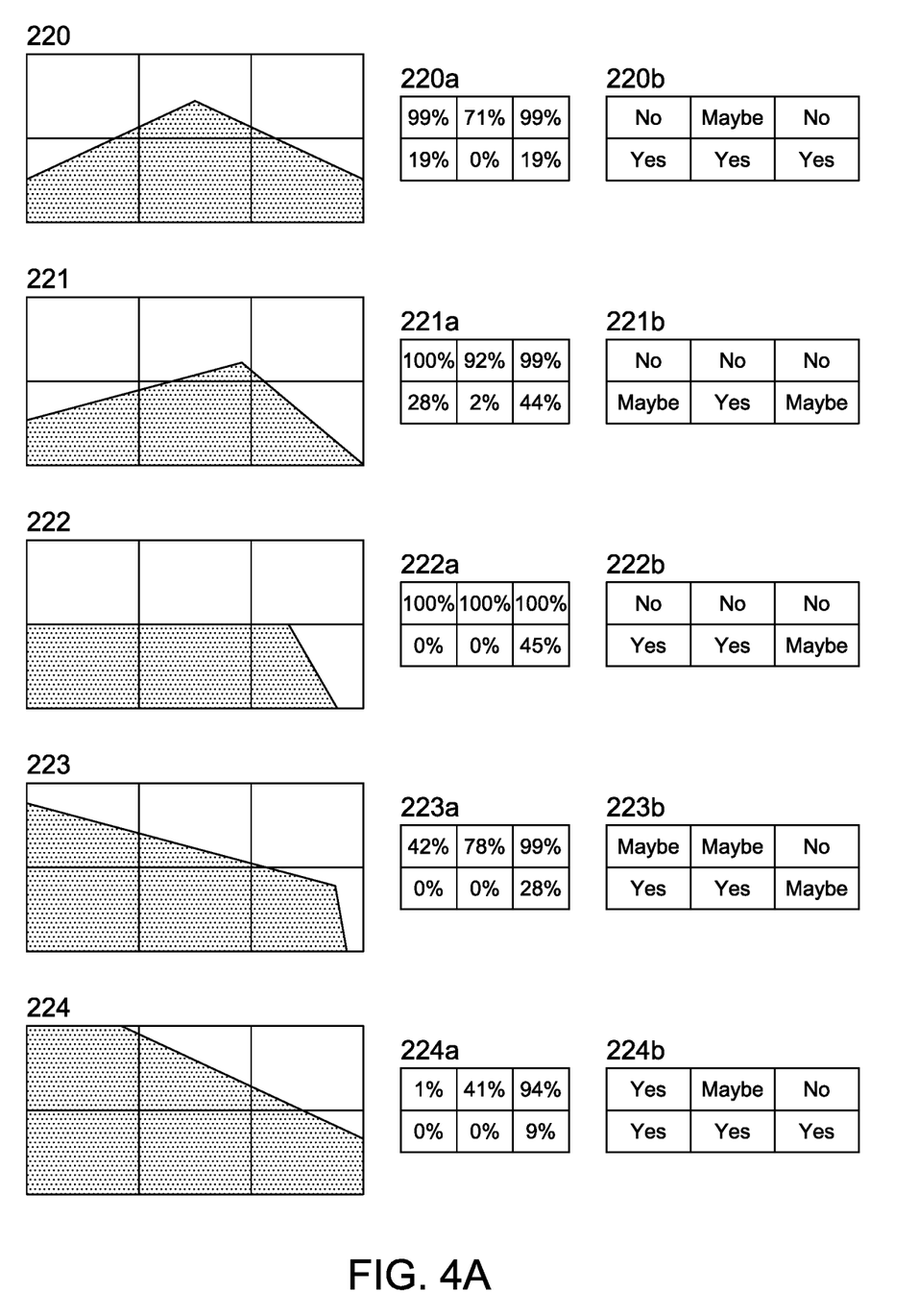
FIGS. 4A and 4B show views and tables associated with the analysis conducted by the autonomous lawn mower embodiment in FIG. 1.
Figure 4B:
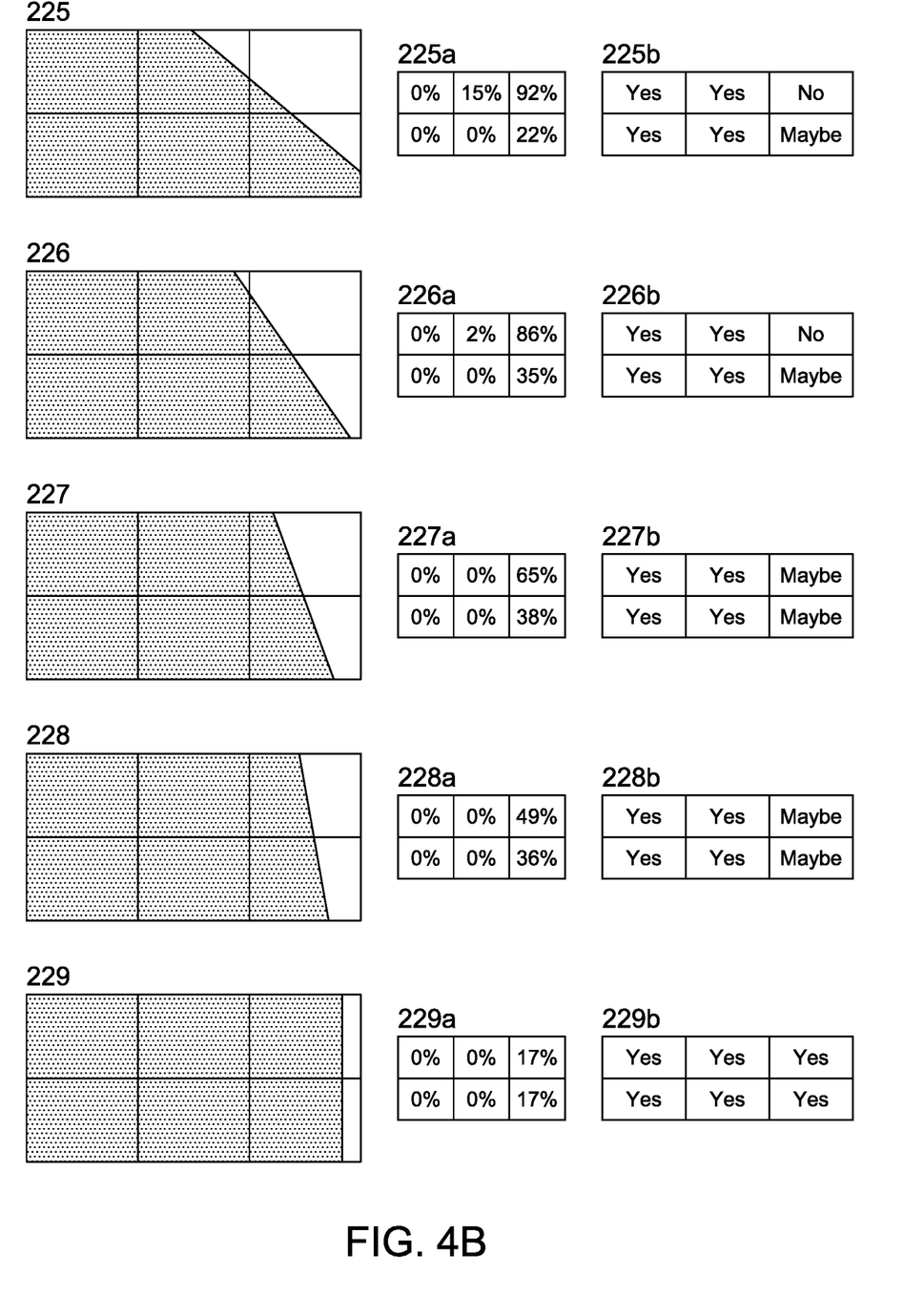

FIGS. 4A-4B show the process by which lawn mower 110 approaches a corner of a lawn, positioned straight ahead. FIG. 4A shows images 220-224, while FIG. 4B shows images 225-229. These ten images show the process through which lawn mower 110 first approaches the corner, turns left to avoid the corner, and then repositions itself on a mowing path along the edge of the lawn, using Lawn Mower Movement Thresholds of 20% and 80%, like the example values described above. Although the descriptions for the following exemplary maneuvers in FIGS. 4A-4B do not specify changes to blade rotation for lawn mower 110, each exemplary maneuver is compatible with, and could also feature, changes to blade rotation based on the Result Value arrangements.

Referring to FIG. 4A, image 220 shows how the lawn (shaded) forms a corner, with unmowable terrain (white) surrounding that corner. Like the images in FIGS. 3A-3B, the images in FIGS. 4A-4B are divided into a grid of six sections. Table 220a shows that, for image 220, the unmowable terrain occupies 99% of the top-left section, 71% of the top-center section, 99% of the top-right section, 19% of the bottom-left section, 0% of the bottom-center section, and 19% of the bottom-right section. Table 220b shows a No in the top-left and top-right cells, a Maybe in the top-center cell, and three Yeses in the bottom cells.

Lawn mower 110 needs to implement a decision-making process to negotiate a corner represented by the symmetry of table 220b. The "symmetry" in table 220b means that there is same arrangement of Result Values on the left as on the right, which might suggest that neither a leftward turn nor a rightward turn is more efficient for avoiding the unmowable object or area than the other. Here, as a purely exemplary maneuver for addressing this symmetry, processor 102 implements a slight leftward turn as it approaches the corner based on the Result Value arrangement in table 220b. And despite the exemplary maneuver presented here, a programmer or user could just as easily program lawn mower 110 to implement a right turn when the lawn mower confronts terrain that results in a symmetrical arrangement of Result Values; or alternatively, lawn mower 110 could simply execute a 180° turn. In a further embodiment, processor 102 can be programed to implement a random turn or pseudo random turn in such situations (e.g. alternate turns, sets of left and right turns based on Result Values in previously processed images, etc.).

The timing of the turn of lawn mower 110 away from the corner determines the mowing precision: the closer lawn mower 110 approaches the corner before turning, the closer cut the lawn receives. Thus, a programmer might input logic into processor 102 that leads lawn mower 110 to implement its slight turn only after the lawn mower has closely—say, for example, within 3-6 inches of the corner—approached the edge of the corner. Because the timing of the start of the turn is a matter of programmer or user preference, the sequence in FIGS. 4A-4B is purely exemplary.

Image 221 shows how the corner has shifted rightward, based on the forward-leftward movement of lawn mower 110. Table 221a shows that, for image 221, the unmowable terrain occupies the 100% of the top-left cell, 92% of the top-center cell, 99% of the top-right cell, 28% of the bottom-left cell, 2% of the bottom-center cell, and 44% of the bottom-right cell. Table 221b lists three Nos across the top cells, Maybes in the bottom-left and bottom-right cells, and a Yes in the bottom-center cell. Because lawn mower 110 has begun a leftward turn to address the symmetrical Result Value arrangement in table 220b, lawn mower 110 will continue its leftward turn as processor 102 analyzes the Result Value arrangement in table 221b.

Image 222 shows how the corner has shifted rightward, based on the forward-leftward movement of lawn mower 110. Table 222a shows that, for image 222, the unmowable terrain occupies 100% of the top-left, top-center, and top-right cells, and 45% of the bottom-right cell, while occupying 0% of the bottom-left and bottom-center cells. Table 222b lists three Nos across the top cells, Yeses in the bottom-left and bottom-center cells, and a Maybe in the bottom-right cell. Based on the three Nos across the top three cells, like the arrangement for 221b, and because lawn mower 110 will already be turning leftward to address the previously discussed symmetrical Result Value arrangements in tables 220b and 221b, lawn mower 110 will continue its leftward turn as processor 102 analyzes the Result Value arrangement in table 222b. The Maybe in the bottom-right cell of table 222b indicates a potential presence of an unmowable surface to the right and nearby lawn mower 110, and helps determine the sharpness at which lawn mower 110 turns leftward.

Image 223 shows how the corner has shifted rightward, based on the forward-leftward movement of lawn mower 110. Table 223a shows that, for image 223, the unmowable terrain occupies 42% of the top-left cell, 78% of the top-center cell, 99% of the top-right cell, and 28% of the bottom-right cell, while occupying 0% of the bottom-left and bottom-center cells. Table 223b lists Maybes in the top-left, top-center, and bottom-right cells, Yeses in the bottom-left and bottom-center cells, and a No in the top-right cell. The No in the top-right cell continues to influence the leftward turn. The Maybes in the top-left, top-center, and bottom-right cells of table 223b indicate a potential presence of an unmowable surface to the right and nearby lawn mower 110, and help determine the sharpness at which lawn mower 110 turns leftward.

Image 224 shows how the corner has shifted rightward, based on the forward-leftward movement of lawn mower 110. Table 224a shows that, for image 224, the unmowable terrain occupies 1% of the top-left cell, 41% of the top-center cell, 94% of the top-right cell, and 9% of the bottom-right cell, while occupying 0% of the bottom-left and bottom-center cells. Table 224b lists Yeses in the top-left and in all the bottom row cells, a Maybe in the top-center cell, and a No in the top-right cell. The No in the top-right cell continues to influence the leftward turn. The Maybe in the top-center cell of table 224b indicates a potential presence of an unmowable surface to the right and nearby lawn mower 110, and helps determine the sharpness at which lawn mower 110 turns leftward.

Referring to FIG. 4B, image 225 shows how the corner has shifted rightward, based on the forward-leftward movement of lawn mower 110. Table 225a shows that, for image 225, the unmowable terrain occupies 15% of the top-center cell, 92% of the top-right cell, and 22% of the bottom-right cell, while occupying 0% of the top-left, bottom-left, and bottom-center cells. Table 225b lists Yeses in the top-left, top-center, bottom-left, and bottom-center cells, a No in the top-right cell, and a Maybe in the bottom-right cell. The No in the top-right cell continues to influence the leftward turn. The Maybe in the bottom-right cell of table 225b indicates a potential presence of an unmowable surface to the right and nearby lawn mower 110, and helps determine the sharpness at which lawn mower 110 turns leftward.

Image 226 shows how the corner has shifted rightward, based on the forward-leftward movement of lawn mower 110. Table 226a shows that, for image 226, the unmowable terrain occupies 2% of the top-center cell, 86% of the top-right cell, and 35% of the bottom-right cell, while occupying 0% of the top-left, bottom-left, and bottom-center cells. Table 226b lists Yeses in the top-left, top-center, bottom-left, and bottom-center cells, a No in the top-right cell, and a Maybe in the bottom-right cell. The No in the top-right cell continues to influence the leftward turn. Like table 225b, the Maybe in the bottom-right cell of table 226b indicates a potential presence of an unmowable surface to the right and nearby lawn mower 110, and helps determine the sharpness at which lawn mower 110 turns leftward.

Image 227 shows how the corner has shifted rightward, based on the forward-leftward movement of lawn mower 110. Table 227a shows that, for image 227, the unmowable terrain occupies 65% of the top-right cell and 38% of the bottom-right cell, while occupying 0% of the top-left, top-center, bottom-left, and bottom-center cells. Table 227b lists Yeses in the top-left, top-center, bottom-left, and bottom-center cells, and Maybes in the top-right and bottom-right cells. With no Nos at all, and two Maybes in the top-right and bottom-right cells, the Result Value arrangement in table 227a will cause processor 102 to control drive controller 103 to command drive system 105 to reduce the degree to which drive system 105 turns lawn mower 110 leftward.

Image 228 shows how the corner has shifted rightward, based on the forward-leftward movement of lawn mower 110. Table 228a shows that, for image 228, the unmowable terrain occupies 49% of the top-right cell and 36% of the bottom-right cell, while occupying 0% of the top-left, top-center, bottom-left, and bottom-center cells. Table 228b lists Yeses in the top-left, top-center, bottom-left, and bottom-center cells, and Maybes in the top-right and bottom-right cells. Like table 227b, with no Nos at all, and two Maybes in the top-right and bottom-right cells, the Result Value arrangement in table 228a will continue the reduced degree at which drive system 105 turns lawn mower 110 leftward.

Image 229 shows how the corner has shifted rightward, based on the prior forward-leftward movement of lawn mower 110. Table 229a shows that, for image 229, the unmowable terrain occupies 17% of the top-right cell and 17% of the bottom-right cell, while occupying 0% of the top-left, top-center, bottom-left, and bottom-center cells. Table 229b lists Yeses in all cells, which results in straight forward movement of lawn mower 110, given the lack of a sufficiently high proportion of unmowable material in view.

While the foregoing description details specific embodiments of the invention, those skilled in the art will appreciate that one could modify or adapt those embodiments based on the teachings herein. Accordingly, the disclosed embodiments are merely illustrative and should not limit the invention's scope.

The invention claimed is:

1. A lawn mower comprising:
   a vision sensor configured to capture an image of an area being approached;
   a processor connected to the vision sensor and comprising logic having a first movement threshold;
   the processor configured to:
      divide the image into a grid of image sections, each of the image sections comprising a separate set of image data, each set of image data corresponding to a respective portion of the area being approached; and
      for each of the image sections in the grid:
         categorize each image datum within the corresponding set of image data as mowable or unmowable;
         calculate a percentage of the corresponding set of image data that is categorized as unmowable; and
         assign a result value based on a comparison between the calculated percentage and the first movement threshold; and
   a drive system in communication with the processor and configured to control movement of the lawn mower based on the result value of each of the image sections in the grid.

2. The lawn mower of claim 1, wherein the processor is configured to categorize each image datum within the sets of image data as mowable or unmowable via an image-recognition algorithm.

3. The lawn mower of claim 1, wherein each of the percentages represents a proportion of the respective portion of the area being approached that is categorized as unmowable.

4. The lawn mower of claim 1, wherein the processor is configured to command the drive system to change a velocity of the movement of the lawn mower based on the result value of each of the image sections in the grid.

5. The lawn mower of claim 4, wherein the change in velocity includes execution of a turn.

6. The lawn mower of claim 5, wherein the drive system is configured to turn the lawn mower away from one of the portions of the area being approached in response to the processor determining that the result value of a corresponding one of the image sections corresponds with the percentage being greater than the first movement threshold.

7. The lawn mower of claim 5, wherein the processor is configured to determine the sharpness of the turn for the drive system based on the result value of each of the image sections in the grid.

8. The lawn mower of claim 1, wherein the processor is configured to command the drive system to maintain a velocity of the movement of the lawn mower based on the result value of each of the image sections in the grid.

9. The lawn mower of claim 8, wherein the drive system is configured to maintain the velocity of the lawn mower in response to the processor determining that the result values of a plurality of the image sections correspond with the respective percentage being less than or equal to the first movement threshold.

10. The lawn mower of claim 1, wherein, for each of the image sections, the processor is configured to assign the result value further based on a comparison between the percentage and a second movement threshold.

11. The lawn mower of claim 10, wherein, for the result value of each of the image sections, the processor is configured to assign:
   a first result value in response to determining that the percentage is less than or equal to the first movement threshold;
   a second result value in response to determining that the percentage is greater than the first movement threshold and less than or equal to the second movement threshold; and
   a third result value in response to determining that the percentage is greater than the second movement threshold.

12. The lawn mower of claim 11, wherein the first movement threshold corresponds with mowable terrain and the second movement threshold corresponds with unmowable terrain.

13. The lawn mower of claim 11, wherein the first result value indicates that the respective portion of the area being approached is mowable, the second result value indicates that the respective portion of the area being approached is potentially mowable, and the third result value indicates that the respective portion of the area being approached is unmowable.

14. The lawn mower of claim 11, wherein the drive system is configured to:

change a velocity of the movement of the lawn mower in response to the processor determining that the result value of one or more of the image sections is the third result value; and maintain the velocity of the movement of the lawn mower in response to the processor determining that the result value of each of the image sections is the first result value.

15. The lawn mower of claim 11, further comprising one or more blades, wherein the processor is configured to shut off the one or more blades based on the result values of the grid of the image sections.

16. A lawn mower comprising:
- a vision sensor configured to capture an image of an area being approached;
- a processor connected to the vision sensor and comprising processing logic having a first movement threshold;
- the processor configured to:
  - divide the image into a grid of image sections, each of the image sections comprising a separate set of image data, each set of image data corresponding to a respective portion of the area being approached; and
  - for each of the image sections in the grid:
    - categorize each image datum within the corresponding set of image data as mowable or unmowable;
    - calculate a percentage of the corresponding set of image data that is categorized as mowable; and
    - assign a result value based on a comparison between the calculated percentage with the first movement threshold; and
- a drive system in communication with the processor and configured to control movement of the lawn mower based on the result value of each of the image sections in the grid.

17. The lawn mower of claim 16, wherein each of the percentages represents a proportion of the respective portion of the area being approached that is categorized as mowable.

18. The lawn mower of claim 16, wherein the processor is configured to command the drive system to maintain or change a velocity of the movement of the lawn mower based on the result value of each of the image sections in the grid.

19. The lawn mower of claim 18, wherein the change in velocity includes a change in direction.

20. A lawn mower comprising:
- a vision sensor configured to capture an image of an area being approached;
- a processor connected to the vision sensor and comprising logic having a first movement threshold;
- the processor configured to:
  - divide the image into a grid of image sections, each of the image sections comprising a separate set of image data, each set of image data corresponding to a respective portion of the area being approached; and
  - for each of the image sections in the grid:
    - categorize each image datum within the corresponding set of image data as mowable or unmowable;
    - calculate a percentage of the corresponding set of image data that is categorized as unmowable; and
    - compare the calculated percentage to the first movement threshold; and
- a drive system in communication with the processor and configured to control a velocity of the lawn mower based on the comparison of the calculated percentage and the first movement threshold for each of the image sections in the grid.

\* \* \* \* \*